Figure 1:
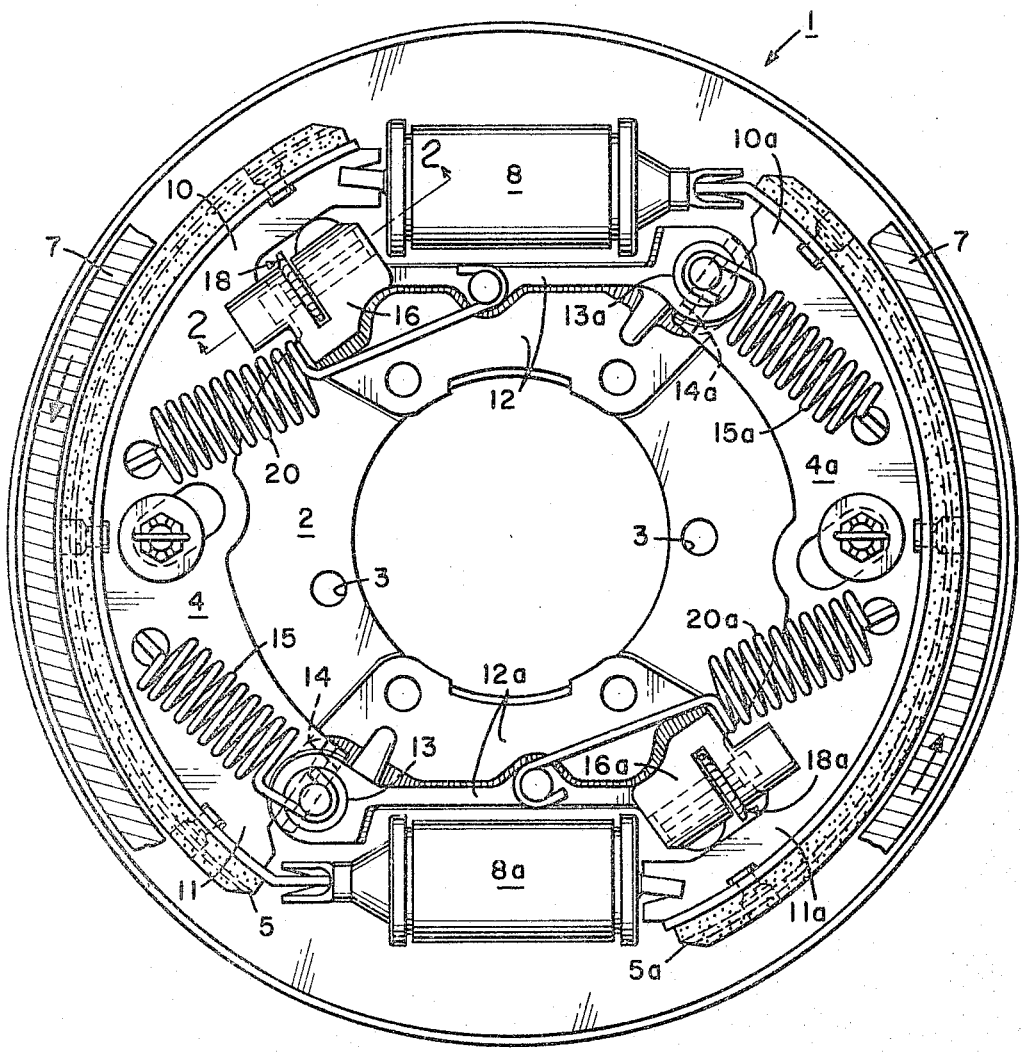

INVENTOR
PATRICK S. STELLA
BY
William R. O'Meara

United States Patent Office 3,299,993
Patented Jan. 24, 1967

1

3,299,993
AUTOMATIC ADJUSTING MECHANISM
Patrick S. Stella, Olivette, Mo., assignor to Wagner Electric Corporation, St. Louis, Mo., a corporation of Delaware
Filed Dec. 24, 1964, Ser. No. 420,885
12 Claims. (Cl. 188—79.5)

This invention relates to automatic adjusting mechanisms and more particularly to an automatic adjusting mechanism for controlling the displacement movement of a friction member of a friction device.

It is a general object of the present invention to provide improved automatic adjustment means for maintaining the displacement between a movable friction member and another friction member cooperable therewith substantially constant irrespective of friction member wear occasioned by frictional engagement between the friction members.

A more specific object of the present invention is to provide an improved automatic adjustment mechanism for controlling the retracted position of a friction member of a friction device to maintain the clearance between the friction member and a cooperable friction element of the friction device substantially constant and which is especially rugged in construction and reliable in operation.

Another object is to provide a novel automatic adjustment mechanism for automatically adjusting the retracted position of a friction member of a friction device to maintain the clearance between the friction member and a cooperable friction element of the device substantially constant irrespective of friction member wear and which can be readily installed without altering parts of the friction device.

Still another object is to provide a novel pre-assembled unit for connection in a friction device for automatically adjusting the retracted position of a friction member of the device to compensate for friction member wear wherein working parts of the adjustor unit are substantially enclosed within a member of the adjustor unit to substantially obviate the entrance of foreign particles into the working parts.

These and other objects and advantages of the present invention will be apparent hereinafter.

Briefly, the present invention embodies adjustment means for a movable friction member of a friction device adjustably movable to define a retracted position for the friction member, other means engaged for following movement with the friction member, and motion translating means including driving means respectively defined between said other means and an interior portion of said adjustment means for translating the movement of said other means into adjusting movement of said adjustment means to redefine the retracted position for the friction member.

Figure 2:
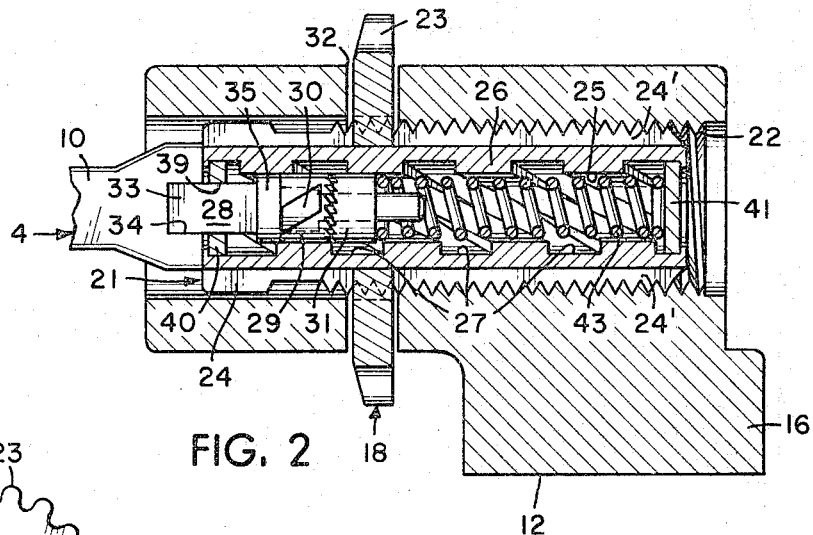
Figure 3:
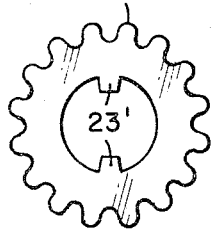
Figures 5, 5A:
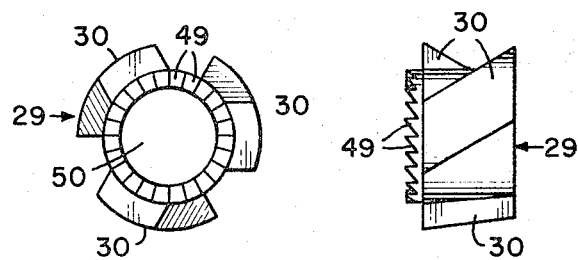
Figure 4:
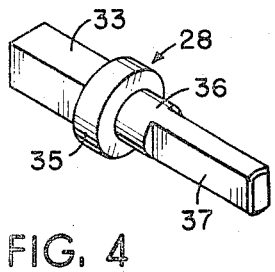
Figures 6, 6A:
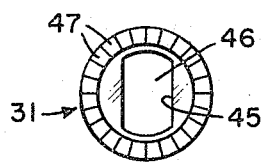

In the drawings which illustrate an embodiment of the present invention,

FIG. 1 is an elevational view of a friction device embodying the present invention, FIG. 2 is a greatly enlarged sectional view taken along the line 2—2 of FIG. 1, FIG. 3 is a plan view of the manual driving member of FIG. 2 on a reduced scale, FIG. 4 is a perspective view of the following member of FIG. 2, FIG. 5 is an enlarged plan view of the drive means of FIG. 2, FIG. 5a is a right side view of the drive means of FIG. 5, FIG. 6 is an enlarged plan view of the holding means of FIG. 2, and

2

FIG. 6a is a right side view of the holding means of FIG. 6.

Referring now to FIG. 1 in particular, a friction device or wheel brake assembly 1 is shown provided with supporting means or a backing plate 2 having a plurality of centrally located mounting apertures 3 therein for connection with a vehicle axle flange (not shown). A pair of opposed radially displaceable friction members or brake shoes 4, 4a are slidably disposed on backing plate 2 having friction material or linings 5, 5a secured thereto, such as by rivets, as shown, or by the well-known method of bonding, the linings being adapted for frictional engagement with a relatively displaceable friction producing member or brake drum 7.

Actuator motors or wheel cylinders 8, 8a are diametrically and oppositely secured, such as by studs, on the backing plate 2 and are operatively connected with adjacent ends 10, 10a and 11, 11a of the brake shoes 4, 4a. Diametrically and oppositely disposed stationary supports or anchor brackets 12, 12a are also secured to the backing plate 2 between adjacent brake shoe ends 10, 10a and 11, 11a, with the anchor brackets also adapted for fixed connection, along with the backing plate, to the non-rotatable vehicle axle flange (not shown). Rotatable anchor pins 13, 13a having radially extending anchoring surfaces 14, 14a are pivotally mounted in the anchor brackets 12, 12a, and return springs 15, 15a are connected between the brake shoes 4, 4a and anchor pins 13, 13a to normally urge the brake shoe ends 11, 10a into respective sliding and pivotal anchoring engagement with the anchoring surfaces 14, 14a. Anchor brackets 12, 12a are also provided with integral portions or housings 16, 16a, and automatic adjustable anchor means or adjustment mechanisms, indicated generally at 18, 18a, are operatively positioned in the anchor bracket housings 16, 16a. A pair of return springs 20, 20a are connected between the brake shoes 4, 4a and the anchor brackets 12, 12a, respectively, to normally urge the brake shoe ends 10, 11a into respective engagement with the adjustable anchor mechanisms 18, 18a. When the drum 7 is rotating in the forward direction, as indicated by the directional arrow, the brake shoe ends 10 and 11a are the unanchored or displaceable ends and shoe ends 10a and 11 are the anchoring ends. However, when the drum 7 is rotating in the reverse direction opposite to the directional arrow, the anchoring and displaceable ends of the brake shoes are also reversed, that is, the brake shoe ends 10 and 11a become the anchor ends and brake shoe ends 10a and 11 become the displaceable ends.

The automatic adjustment mechanisms 18, 18a, with which the present invention is primarily concerned, are identical in construction and operation except that mechanism 18 automatically adjusts the retracted position of shoe 4 to compensate for wear of lining 5 while mechanism 18a automatically adjusts the retracted position of shoe 4a to compensate for wear of lining 5a. For this reason, only mechanism 18 is shown and described herein in detail.

As seen in FIG. 2, the adjusting mechanism 18 includes a pre-assembled automatic adjustor unit 21 disposed in a threaded bore 22 in housing 16 of bracket 12 for automatically adjusting the retracted position of brake shoe 4, and a driving or starwheel member 23, shown also in FIG. 3, for manually turning the unit 21 in bore 22. The adjustor unit 21 includes an adjustable anchor member or extendable, externally threaded, adjusting screw 24 threadedly received in bore 22. The adjusting screw 24 is provided with an axially extending bore 25 and is internally threaded; the threads, which are indicated generally at 26, are shown as three symmetrical, helical grooves 27 formed in the wall of bore 25. An elongated follower member or push rod 28, shown also in FIG. 4, is slidably disposed in the bore 25 for axial movement therein and is provided with a drive member or helical gear 29 having three symmetrical, helical threads 30, FIGS. 5 and 5a, on the radially outer periphery thereof which are threadedly received in the three grooves 27, respectively, and an annular holding or ratchet member 31, FIGS. 6 and 6a, is engaged with the drive member 29.

The starwheel member 23 is disposed in a slot 32 in housing 16 which intersects bore 22 and is provided with an opening through which the adjustor unit 21 extends, the diameter of the opening in the member 23 being of sufficient size relative to screw 24 to permit free axial movement of the screw 24 relative to member 23. The starwheel member 23 is also provided with a pair of opposed radially inwardly extending keys 23' which extend into a pair of axially extending opposed keyways 24' in the periphery of screw 24 and serve to rotate screw 24 when starwheel member 23 is manually rotated.

The push rod 28 has a non-circular end portion 33 which is received in a slot 34 formed in end 10 of shoe 4 whereby the rod is held against rotation. The rod 28 is also provided with an annular guide portion 35 which is slidable in bore 25 to guide the rod 28 for axial movement relative to the screw 24, an annular bearing portion 36 on which the drive member 29 is disposed for rotation, and a non-circular portion 37, shown generally rectangular in shape, which receives the ratchet member 31. The end portion 33 of push rod 28 extends through an opening 39 formed in an annular end wall member 40 at the left end of the adjusting screw 24, the end portion 33 and end wall member 40 being in relative close fitting relation and serving to substantially prevent the entrance of foreign particles into the bore 25 from the left end thereof. The adjusting screw 24 is also provided with an end wall member 41 at the right end thereof which closes the right end of bore 25 and prevents the entrance of foreign particles into the bore from the right end thereof. The end wall members 40, 41 may be secured in place such as by press fitting and/or swaging operations. A compression spring 43 is disposed in bore 25 between the ratchet member 31 and the right end wall member 41 to normally urge the ratchet member 31, drive member 29 and push rod 28 in a direction toward the shoe end 10 to effect concerted movement thereof with the shoe end 10. In FIG. 2, the left end of adjusting screw 24 is engaged by shoe end 10 to define the retracted position of shoe 4, the shoe 4 being normally urged to its retracted position by the shoe return spring 20.

The ratchet member 31, as seen in FIG. 6, has a radially inner peripheral surface 45 defining a non-circular opening 46, shown rectangular in shape, which receives the rectangular portion 37 of the push rod 28, the surface 45 and the walls of portion 37 cooperate to prevent rotation of the ratchet member 31 but permit relative axial movement therebetween. The ratchet member 31 is also provided with axially extending gear teeth 47 formed in the left side wall thereof which mesh with axially extending gear teeth 49 formed in the right side wall, as viewed in FIG. 2, of drive member 29. The drive member 29 is provided with an annular opening or bore 50, FIG. 5, so that it is rotatable on the annular portion 36 of the push rod 28. The drive member 29 and ratchet member 31 are disposed on push rod 28 within the bore 25 with the drive member 29 between the guide portion 35 and the ratchet member 31. The ratchet member teeth 47 and drive member teeth 49 are shown in the illustrated embodiment as being unsymmetrical or sawtooth in shape so that the non-rotatable ratchet member 31 stops or prevents rotation of the drive member 29 in one direction of rotation to effect rotation of screw 24, but the drive member teeth 49 are able to slide up or slip by the ratchet member teeth 47 so as to permit rotation of the drive member 29 in the opposite direction of rotation relative to the screw 24 and ratchet member 31 in response to a rotary force applied to the drive member, as will be more fully discussed hereinafter.

In describing the operation of automatic adjusting mechanism 18, it will first be assumed that there is a desired predetermined minimum amount of clearance between the drum 7 and lining 5 of brake shoe 4 and the drum is rotating in the forward direction so that end 10 is the displaceable end of shoe 4. It will further be assumed that the brake 1 is de-energized with the mechanism 18 in the condition shown in FIG. 2 wherein the shoe 4 is in the retracted position and the ratchet member teeth 47 and drive member teeth 49 are in engagement but somewhat out of full mesh. When the wheel cylinders 8, 8a are energized, such as by transmitting fluid pressure, for example, from a master cylinder or the like (not shown), actuating forces are established which effect displacement movement of the brake shoes 4, 4a into frictional engagement with the drum 7 to thereby effect energization of the brake 1. During the above-mentioned displacement movement of shoe 4, the force of spring 43 effects leftward axial movement of ratchet member 31 which, in turn, effects leftward axial movement of drive gear 29 and push rod 28. Since the drive member 29 is threadedly coupled to the adjusting screw 24 by means of the cooperating helical teeth 30 and helical grooves 27, and the ratchet teeth 47 are urged against drive member teeth 49, the above-mentioned leftward movement of the ratchet member 31 causes the drive member 29 to rotate slightly relative to screw 24 and ratchet member 31 in a direction toward full mesh with the ratchet member 31. Since the drive member 29 is able to rotate relative to screw 24 under these assumed conditions, the adjusting screw 24 is not rotated and no adjustment of the retracted position of shoe 4 is made. If now the brake 1 is de-energized, such as by exhausting the fluid pressure in wheel cylinders 8, 8a, the return spring 20 effects retractile movement of the shoes 4, 4a to the retracted positions, thus returning the push rod 28, drive member 29 and ratchet member 31 to the positions shown in FIG. 2 and without having rotated the adjusting screw 24. More specifically, during this retractile or rightward stroke of shoe 4, the push rod 28 moves the drive member 29 and ratchet member 31 axially against the force of spring 43 with the drive member teeth 49 moving the ratchet member 31 on push rod portion 37 slightly away from the drive member 29 and sliding on the ratchet teeth 47 whereby the drive member rotates relative to screw 24 and in the opposite direction back to its original position shown in FIG. 2. The "play" or relative sliding movement between the teeth 47 and 49, as well as any inherent "play" between the other parts, such as by the drive member threads 30 and grooves 27, provide a predetermined amount of lost motion between the shoe 4 and adjusting screw 24 so that the adjusting screw is not rotated to adjust the retracted position of the shoe 4 when the clearance between the drum 7 and lining 5 is at a desired predetermined minimum amount.

When the friction lining 5 wears due to the frictional engagement thereof with the rotatable drum 7, the displacement movement of shoe 4, push rod 28, drive member 29, and ratchet member 31 increases because of the increase in shoe clearance as a result of the lining wear. Upon the occurrence of a relatively small amount of water, the force of spring 43, during displacement movement of shoe 4, moves ratchet member 31 axially leftwardly effecting axial movement of drive member 29 and rod 28 with shoe 4. The drive member 29, during this excess displacement movement of shoe 4, translates the axial or linear movement of the shoe 4 and push rod 28 into rotational movement of the adjusting screw 24 to adjust the retracted position of shoe 4. More particularly, during this displacement movement of shoe 4, the ratchet member 31 first effects slight rotation of drive member 29 into mesh therewith thereby locking it against further rotation and, thereafter, the axially moving drive member, being unable to rotate, effects rotation of the adjusting screw 24. In other words, after the drive member teeth 49 move into locked engagement with ratchet teeth 47 to prevent further rotation of drive member 29, the helical threads 30 move axially with the walls thereof applying an axial force to the helical walls of grooves 27 thereby effecting rotation of the adjusting screw 24 in a direction to slightly axially advance the screw 24 toward the drum 7, tending to reduce the shoe clearance. On the return or retractile stroke of shoe 4, the push rod 28 moves the drive member 29 axially effecting reverse rotation thereof relative to the screw 24 until the shoe end 10 again engages screw 24. During this reverse rotation of drive member 29, the teeth 49 thereon slide on ratchet member teeth 47 in a direction away from the locked position so that when the shoe 4 is in the retracted position teeth 47 and 49 are out of mesh to a greater extent than they were originally because the effective gear or thread ratio between the external threads or adjusting screw 24 and the threads 30 on drive member 29 is such that the displacement advance of the drive member is greater than the axial advance of the screw 24. The above slight axial advance of screw 24 does not fully compensate for the amount of increase in shoe clearance but does reduce the rate of increase in clearance due to wear. Until further lining wear occurs, the drive member 29 merely rotates back and forth relative to the adjusting screw 24 and ratchet member 31 during subsequent braking operations.

Upon further wear of lining 5, adjusting screw 24 will be slightly adjusted during displacement movements of shoe 4 and drive member 29 will become still further out of mesh with ratchet member 31 in the retracted position of shoe 4 until the drive member eventually indexes over the ratchet member during a retractile stroke of the push rod 28 so that the drive member teeth 49 and ratchet teeth 47 are in full mesh when the shoe 4 is in the retracted position with the drive member angularly displaced from its original position relative to the ratchet member. On the displacement stroke of the shoe 4 following the retractile stroke on which the drive member 29 indexes over teeth 47, the ratchet member 31, being in full mesh with drive member 29 and preventing rotation thereof, effects axial movement of the drive member which, in turn, rotates the adjusting screw 24 thereby advancing screw 24 axially toward drum 7. On the return or retractile stroke of shoe 4, push rod 28 will rotate the drive member 29 relative to screw 24 and ratchet member 31 so that the drive member teeth 49 will again be out of mesh with the ratchet teeth 47 in the retracted position of shoe 4 and thus return lost motion to the adjustor unit 21. This axial advance of the screw 24 is sufficient to compensate for the wear of lining 5, that is, the retracted position of shoe 4 will now be adjusted such that the displacement movement or shoe clearance is returned to the desired predetermined minimum amount. With the clearance between lining 5 and drum 7 at the desired minimum, no further adjustment of screw 24 takes place during subsequent braking applications until further lining wear occurs.

The automatic adjustor unit 21 is a preassembled unit which can be readily installed in the housing 16 before shoe 4 is attached without any alteration of brake parts. Unit 21 may be installed by placing starwheel member 23 in slot 32 and inserting the unit 21 into the bore 22 so that the keyways 24' receive the keys 23' of the starwheel member. The adjustor unit 21 may then be manually adjusted by turning starwheel member 23 to provide a suitable clearance. Application of the brake one or more times will automatically operate the adjustor unit 21 to adjust the retracted position of shoe 4 until there is a predetermined minimum amount of shoe clearance. As is apparent from the foregoing description and drawings, neither the brake applying forces nor the shoe anchoring forces are applied to or transmitted through the drive member 29 or ratchet member 31. Thus, these parts, as well as other parts, can be economically made relatively small. Also, with the right end of the bore 25 enclosed by wall member 41 and with the push rod 28 in close fitting relation with wall member 40 at the left end of the adjusting screw 24, the working parts are substantially enclosed by the adjusting screw 24 and protected from foreign particles, such as dust and the like.

It is now apparent that novel automatic adjusting means meeting the objects set out hereinbefore are provided and that changes and modifications in the disclosure may be made by those skilled in the art without departing from the spirit and scope of the invention as defined by the claims which follow.

The embodiments of the invention in which an exclusive property or privilege is claimed are defined as follows:

1. In a friction device having a pair of relatively displaceable friction members for energization into frictional engagement, extendable means having a bore therein and rotatably supported in said friction device to adjustably define the retracted position of one of said members, and motion translating means including other means movable in said bore and engaged with said one member for linear movement in concert therewith, drive means in said bore engaged with said other means for linear movement in concert therewith, driven wall means on the side wall of said bore for rotating said extendable means, and means on said drive means drivingly engaged with said wall means to translate linear movement of said drive means into rotary movement of said extendable means to extend said extendable means in response to a predetermined movement of said one member to adjust the retracted position of said one member.

2. In a friction device having a pair of relatively displaceable friction members for energization into frictional engagement, extendable means rotatably supported in said friction device to adjustably define the retracted position of one of said member, said extendable member having an axial bore therein and helical wall means in the bore, and motion translating means including follower means mounted for axial movement in said bore and engaged with said one member for concerted movement therewith, drive means in said bore engaged with said follower means for axial movement in concert therewith, and wall means on said drive means slidably engaging said helical wall means to effect rotation and extension of said extendable means in response to a predetermined movement of said one member to adjust the retracted position of said one member.

3. In a friction device having a friction member mounted for movement between a retracted position and a displaced position in frictional engagement with a coacting member, means defining the retracted position of said friction member including support means, and an extendable member rotatably supported by said support means and extendable relative thereto when rotated to adjustably define the retracted position of said friction member, said extendable member having an axial bore therein, follower means mounted for axial movement in said bore and engaged with said friction member for concerted movement therewith, rotatable drive means in said bore engaged with said follower means for concerted axial movement therewith, and motion translating means including means for coupling engagement between said drive means and follower means upon concerted axial movement thereof in excess of a predetermined amount, and drivingly engaged means respectively defined on said drive means and the sidewall of said bore for translating the axial movement of said drive means in excess of the predetermined amount into rotary movement of said extendable means to effect the extension thereof and adjust the retracted position of said friction member.

4. In a friction device having a friction member mounted for movement between a retracted position and a displaced position in frictional engagement with a coacting member, extendable means rotatably supported on said friction device and extendable when rotated to adjustably define the retracted position of said friction member, follower means engaged with said friction member for linear movement in concert therewith, rotatable drive means engaged with said follower means for linear movement in concert therewith, a threaded coupling between said drive means and said extendable means, said threaded coupling providing rotation of said drive means relative to said extendable means in response to the concerted linear movement of said drive means with said follower means less than a predetermined amount and holding means between said drive means and follower means engageable in response to the concerted linear movement thereof in excess of the predetermined amount to prevent rotation of said drive means, said threaded coupling serving to rotate said extendable means to effect extension thereof and adjust the retracted position of said friction member in response to movement of said drive means in excess of the predetermined amount upon the engagement of said holding means.

5. In a friction device having a friction member mounted for movement between a retracted position and a displaced position in frictional engagement with a coacting member, extendable means rotatably supported by said friction device and extendable when rotated to adjustably define the retracted position of said friction member, said extendable means having an axial bore therein, follower means mounted for axial movement in said bore and engaged with said friction member for concert movement therewith, rotatable drive means disposed on said follower means for rotatable movement relative thereto and for axial movement in concert therewith, a threaded coupling defined between said drive means and the sidewall of said bore providing rotation of said drive means relative to said extendable means and follower means in response to the concerted axial movement of said drive means and follower means less than a predetermined amount, and holding means between said follower means and said drive means to prevent rotation of said drive means in response to concerted axial movement of said follower means and drive means in excess of the predetermined amount, said threaded coupling serving to effect rotation of said extendable means to adjust the retracted position of said friction member in response to the concerted axial movement of said follower means and drive means in excess of the predetermined amount when said holding means prevents the relative rotation of said drive means.

6. In a friction device having a friction member mounted for movement between a retracted position and a displaced position in frictional engagement with a coacting member, means defining the retracted position of said friction member including support means, and an extendable member rotatably supported by said support means and extendable relative thereto when rotated to adjustably define the retracted position of said friction member, a bore in said extendable member, groove means defined in the sidewall of said bore, resiliently urged means axially movable in said bore and engaged with said friction member for concerted movement therewith, drive means disposed on said resiliently urged means for rotatable movement relative thereto and for concerted axial movement therewith, said drive means being rotatable relative to said resiliently urged means and said extendable means in response to concerted axial movement of said drive means and resiliently urged means less than a predetermined amount, means on said drive means and drivingly disposed in said groove means to translate axial movement of said drive means in excess of the predetermined amount, and other means respectively disposed on said resiliently urged means and drive means movable into locking engagement in response to the concerted axial movement of said resiliently urged means and said drive means in excess of the predetermined amount to thereafter obviate rotation of said drive means, said means on said drive means being movable in said groove means in response to the axial movement of said drive means in excess of the predetermined amount to drivingly rotate said extendable means and effect the extension thereof relative to said support means for adjustably redefining the retracted position of said friction member.

7. In a friction device having a friction member mounted for movement between a retracted position and a displaced position in frictional engagement with a coacting member, means defining the retracted position of said friction member including support means, and an extendable member rotatably supported by said support means and extendable relative thereto when rotated to adjustably define the retracted position of said friction member, said extendable member having an axial bore therein with helical thread means on the side wall of said bore, an elongated follower member mounted for axial movement in said bore with an exterior portion thereof engaged with said friction member, gear means rotatably disposed on said follower member in said bore, said gear means having helical thread means thereon threadedly coupled with said bore thread means and a plurality of axially extending teeth on one side wall thereof, ratchet means mounted in said bore for axial movement in concert with said follower member and locking engagement with said teeth for preventing rotation of said gear means, and resilient means in said bore resiliently urging said ratchet and gear means and said follower member in a direction toward said friction member to effect axial movement thereof in concert with said friction member, said gear means being locked against rotation by said ratchet means and axially movable to effect rotation of said extendable member to adjust the retracted position of said friction member in response to a predetermined movement of said friction member.

8. In a friction device having a friction member mounted for movement between a retracted position and a displaced position in frictional engagement with a coacting member, means defining the retracted position of said friction member including support means, and an extendable member rotatably supported by said support means and extendable relative thereto when rotated to adjustably define the retracted position of said friction member, said extendable member having an axial bore therein with helical thread means on the side wall of said bore, an elongated follower member mounted for axial movement in said bore with an exterior portion thereof engaged with said friction member, gear means rotatably disposed in said bore with one side wall engaged with said follower member for axial movement in concert therewith, said gear means having helical thread means thereon threadedly coupled with said bore thread means and a plurality of axially extending teeth in the side wall opposite said one side wall, ratchet means non-rotatably mounted on said follower member for axial movement in concert therewith and for locking engagement with said teeth to prevent rotation of said gear means, and resilient means in said bore resiliently urging said ratchet and gear means and said follower member in a direction toward said friction member to effect axial movement thereof in concert with said friction member, said gear means being locked against rotation by said ratchet means and axially movable in said direction to effect rotation of said extendable member to adjust the retracted position of said friction member in response to a predetermined movement of said friction member in one direction, said drive means being axially movable in the opposite direction and rotatable relative to said extendable member and said ratchet means in response to movement of said friction member in the opposite direction.

9. In a brake assembly having a movably mounted friction member with friction lining thereon, a rotatable coacting member, actuating means engaged with said friction member for displacing said friction member in a brake energizing direction from a retracted position to a displaced position wherein said lining frictionally engages said coacting member, and return spring means connected to said friction member for moving said friction member from engagement with said coacting member to the retracted position, automatic adjustment means for maintaining the displacement movement of said friction member relative to said coacting member between predetermined minimum and maximum limits irrespective of friction member wear occasioned by said frictional engagement comprising support means, adjustable anchor means for said friction member connected to said support means for rotation and longitudinal displacement relative thereto when rotated for adjusting the retracted position of said friction member, said anchor means having an axial bore therein with helical thread means on the side wall of said bore, an elongated follower member mounted for axial movement in said bore with an exterior portion thereof engaged with said friction member, gear means rotatably disposed in said bore with one side wall engaged with said follower member, said gear means having helical thread means thereon threadedly connected with said bore thread means and a plurality of axially extending teeth on the side wall thereof opposite said one side wall, ratchet means mounted in said bore for axial non-rotational movement and locking engagement with said teeth for preventing rotation of said gear means, resilient means in said bore resiliently urging said ratchet and gear means and said follower member in a direction toward said friction member to effect concerted movement thereof in concert with said friction member, said resilient means urging said ratchet member into locking engagement with said gear means to prevent rotation thereof and move said gear means axially in one direction in response to movement of said friction member in one direction to effect limited rotation of said anchor means to adjust the retracted position of said friction member and thereby limit increasing friction member displacement as said friction lining wears, said follower member moving said gear means in the opposite direction in response to movement of said friction member in the opposite direction after said friction member displacement reaches said predetermined maximum limit to rotate said gear means relative to said anchor means and index said gear means relative to said ratchet member so that upon subsequent movement of said friction member in said one direction said gear means effects rotation of said anchor means to further adjust the retracted position of said friction member.

10. An automatic adjustor assembly for use in a friction device having a friction member mounted for movement between a retracted position and an extended position in frictional engagement with a coacting member, and a fixed support member having a threaded opening therein adjacent a portion of said friction member, said adjustor assembly comprising an externally threaded adjusting screw for threaded connection in said opening to adjustably define the retracted position of said friction member, said screw having a bore therein with helical thread means on the side wall of said bore, an elongated follower member mounted for axial movement in said bore with an exterior portion thereof engageable with said friction member adjacent one end of said screw, a gear member rotatably disposed on said follower member in said bore with one side wall thereof engaging said follower member for axial movement therewith, said gear member having helical thread means thereon threadedly connected with said bore thread means and a plurality of axially extending teeth on the side wall thereof opposite said one side wall, a ratchet member non-rotatably disposed on said follower member in said bore for toothed engagement with said teeth for locking said gear member against rotation, and resilient means in said bore between said ratchet member and the opposite end of said screw normally urging said ratchet, gear, and follower members toward said friction member for effecting axial movement thereof in concert with said friction member, said resilient means urging said ratchet member into locking engagement with said gear member to prevent rotation thereof and moving said gear member axially to effect rotation of said screw for adjusting the retracted position of said friction member in response to a predetermined movement of said friction member in one direction, said follower member effecting rotation of said gear member relative to said screw and ratchet members in response to a predetermined movement of said friction member in the opposite direction.

11. The automatic adjustor assembly of claim 10 wherein said screw has end wall means closing said bore at said opposite end thereof.

12. In a friction device having a friction member movable between a retracted position and a displaced position for frictional engagement with a coacting member, means adjustably movable on said friction device relative to said friction member and defining a retracted position for said friction member, a bore in said first named means, follower means movable in said bore for following engagement with said friction member, and motion translating means including drivingly engaged means respectively defined on the side wall of said bore and on said follower means for translating the friction member following movement of said follower means into adjusting movement of said first named means to redefine the retracted position for said friction member.

References Cited by the Examiner
UNITED STATES PATENTS

| | | | |
|---|---|---|---|
| 1,817,081 | 8/1931 | Jonas. | |
| 2,775,321 | 12/1956 | Phillips | 188—196 |
| 3,115,955 | 12/1963 | Knocks | 188—196 X |

References Cited by the Applicant
UNITED STATES PATENTS

| | | |
|---|---|---|
| 1,613,778 | 1/1927 | Worden. |
| 2,130,875 | 9/1938 | Colman. |
| 2,695,078 | 11/1954 | Brooks. |
| 2,730,205 | 1/1956 | Bauman. |
| 2,748,901 | 6/1956 | Brooks. |
| 2,774,445 | 12/1956 | Pontius. |
| 2,788,095 | 4/1957 | Brooks. |
| 2,818,143 | 12/1957 | Phillips. |
| 2,938,610 | 5/1960 | Dombeck. |

DUANE A. REGER, *Primary Examiner.*